(12) United States Patent
Södö et al.

(10) Patent No.: US 10,910,983 B2
(45) Date of Patent: Feb. 2, 2021

(54) METHOD FOR ADJUSTING AN INVERTER CONNECTED TO AN ELECTRIC MOTOR VIA A DU/DT FILTER

(71) Applicant: Vacon Oy, Vaasa (FI)

(72) Inventors: Nicklas Södö, Vaasa (FI); Olli Erkkilä, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 16/542,814

(22) Filed: Aug. 16, 2019

(65) Prior Publication Data

US 2020/0083836 A1  Mar. 12, 2020

(51) Int. Cl.
*H02P 27/08* (2006.01)
*H02M 7/5387* (2007.01)

(52) U.S. Cl.
CPC ........ *H02P 27/08* (2013.01); *H02M 7/53871* (2013.01)

(58) Field of Classification Search
CPC .... H02P 27/08; H02P 27/085; H02M 7/5387; H02M 7/53871
See application file for complete search history.

(56) References Cited

U.S. PATENT DOCUMENTS

| | | | | |
|---|---|---|---|---|
| 5,990,654 A | * | 11/1999 | Skibinski | H02M 1/126 307/105 |
| 6,014,497 A | * | 1/2000 | Kerkman | H02M 7/53875 318/254.2 |
| 6,208,537 B1 | * | 3/2001 | Skibinski | H02M 1/12 363/40 |
| 7,245,102 B1 | * | 7/2007 | Spong | H02M 5/458 318/632 |
| 2005/0207194 A1 | * | 9/2005 | Baudesson | H02M 7/487 363/98 |
| 2007/0210847 A1 | | 9/2007 | Baudesson et al. | |

FOREIGN PATENT DOCUMENTS

WO     2017144114 A1    8/2017

* cited by examiner

*Primary Examiner* — Rina I Duda
(74) *Attorney, Agent, or Firm* — McCormick, Paulding & Huber PLLC

(57) ABSTRACT

The method for adjusting an inverter (1) connected to an electric motor (2) via a du/dt-filter (3) and a motor cable (4) is described. The method comprises the steps of generating a pulse on the motor cable by means of the inverter (1) measuring a cycle time of a pulse answer from consecutive current peaks, determining a time delay $t_d$ from the cycle time, determining a dwell time $T_{dwell}$ to be avoided from the time delay $t_d$ by $T_{dwell} = k \cdot t_d$, $k \in \{2, 6, 10, \ldots\}$ adjusting the time between consecutive switchings of the inverter (1) to be out of a range from $T_{dwell} - t_A$ to $T_{dwell} + t_A$ wherein $t_A$ is an allowable deviation from $T_{dwell}$.

20 Claims, 2 Drawing Sheets

METHOD FOR ADJUSTING AN INVERTER CONNECTED TO AN ELECTRIC MOTOR VIA A DU/DT FILTER

CROSS-REFERENCE TO RELATED APPLICATION

This application claims foreign priority benefits under U.S.C. § 119 to German Patent Application No. 102018121888.5 filed on Sep. 7, 2018, the content of which is hereby incorporated by reference in its entirety.

TECHNICAL FIELD

The present invention relates to a method for adjusting an inverter connected to an electric motor via a du/dt filter and a motor cable.

BACKGROUND

WO 2017/144114 A1 shows a power electronic converter and a method for controlling it, wherein a voltage pulse is generated on the motor cable and the voltage response is detected in order to adjust the time between consecutive switchings of the inverter.

However, when a du/dt-filter is used, the method described in WO 2017/144114 A1 cannot be used, since the filter filters the reflected pulse, so it cannot be seen at the inverter output.

SUMMARY

The object underlying the present invention is to adjust an inverter which is connected to a motor via a du/dt-filter and a motor cable.

This object is solved with a method comprising the steps of generating a pulse on the motor cable by means of the inverter, measuring a cycling time of a pulse answer from consecutive current peaks, determining a time delay $t_d$ from the cycle time, determining a dwell time $T_{dwell}$ to be avoided from the time delay $t_d$ by $T_{dwell}=k \cdot t_d$, $k \in \{2, 6, 10, \ldots\}$, adjusting the time between consecutive switchings of the inverter to be out of a range from $T_{dwell}-t_A$ to $T_{dwell}+t_A$, wherein $t_A$ is an allowable deviation from $T_{dwell}$.

The du/dt-filter is used to limit voltage rise time and maximum voltage seen by the motor. This might be necessary to protect motor isolations and guarantee long lifetime. Typical du/dt-filters consist of chokes and star connected capacitors which together form a second order low pass filter. In addition, there can be resistors in parallel of inductors or in series with capacitors to increase damping. The motor cable behaves as a transmission line. Reflecting waves can increase maximum voltage at motor terminals and voltage can exceed motor specifications especially with long motor cables. The time delay $t_d$ is defined as the time for voltage (or any signal) to propagate from the inverter to the motor. $t_d$ can be calculated as $$t_d = \frac{1}{v} = l \cdot \sqrt{LC}$$

where l is the length of the cable, v the propagation velocity, L inductance of the cable and C capacitance of the cable. The voltage at motor terminals is oscillating due to reflections and the cycle time $T_{OSC}$ is four times the propagation time delay $t_d$.

The dwell time $T_{dwell}$ is defined as a time between consecutive switchings of the same switch in the inverter or the same voltage between two phases in the inverter. Voltage reflections can be optimized by using suitable dwell times in inverter control and in this way it is possible to limit maximum voltage at the motor.

In an embodiment of the invention the pulse is at least so long as to generate two consecutive reflected current peaks.

In an embodiment of the invention the generated current is measured by the inverter. The inverter already has means for measuring the current and the current peaks. Accordingly, no additional means for measuring the current peaks are necessary.

In an embodiment of the invention $t_A = 2 \cdot t_d \cdot p$, wherein p is a factor depending on a width of the first pulse of the pulse answer. This is a simple way to determine the allowable deviation. The parameter p can be, for example, 50% of the width of the first pulse.

In an embodiment of the invention the allowed dwell times are stored in a look-up table. The allowed dwell times can be determined in a set-up step.

In an embodiment of the invention the pulse is generated by closing a first switch in a first phase and a second switch in a second phase of the inverter. Thus, the pulse is generated between two phases of the inverter. When using three phases U, V, W, the test pulse can be generated using any differential mode pulse combination, i.e. U to V, U to W, V to W, U to V and W, V to U and W, W to U and V and all these also in reverse polarity.

In an embodiment of the invention the first switch and the second switch are closed at the same time.

In an embodiment of the invention at the end of the pulse generation the first switch is opened at a first time and the second switch is opened at a second time different from the first time. The test pulse is ended so that switches are not opened at the same time. This has the advantage that the test pulse will not be reversed because of current commutations.

In an embodiment of the invention a difference between the first time and the second time is in a range from 40 to 80 μs.

In accordance with the invention, there is provided also a non-volatile computer readable medium encoded with a computer program for adjusting an inverter connected to an electric motor via a du/dt filter and a motor cable, the computer program comprising computer executable instructions for controlling a programmable processor to:

generating a pulse on the motor cable by means of the inverter, measuring a cycle time $T_{OSC}$ of a pulse answer from consecutive current peaks, determining a time delay $t_d$ from the cycle time, determining a dwell time $T_{dwell}$ to be avoided from the time delay $t_d$ by $$T_{dwell}=k \cdot t_d, \; k \in \{2,6,10,\ldots\},$$

adjusting the time between consecutive switchings of the inverter to be out of a range from $T_{dwell}-t_A$ to $T_{dwell}+t_A$ wherein $t_A$ is an allowable deviation from $T_{dwell}$.

In accordance with the invention, there is provided also a new computer program product. The computer program product comprises a non-volatile computer readable medium, e.g. a compact disc "CD", encoded with a computer program according to the invention.

Various exemplifying and non-limiting embodiments of the invention are described in accompanied dependent claims.

Exemplifying and non-limiting embodiments of the invention both as to constructions and to methods of operation, together with additional objects and advantages thereof, are best understood from the following description of specific exemplifying embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

An embodiment of the invention will now be described in more detail under reference to the drawing, in which.

DETAILED DESCRIPTION

The specific examples provided in the description below should not be construed as limiting the scope and/or the applicability of the accompanied claims. Lists and groups of examples provided in the description below are not exhaustive unless otherwise explicitly stated.

Figure 1:
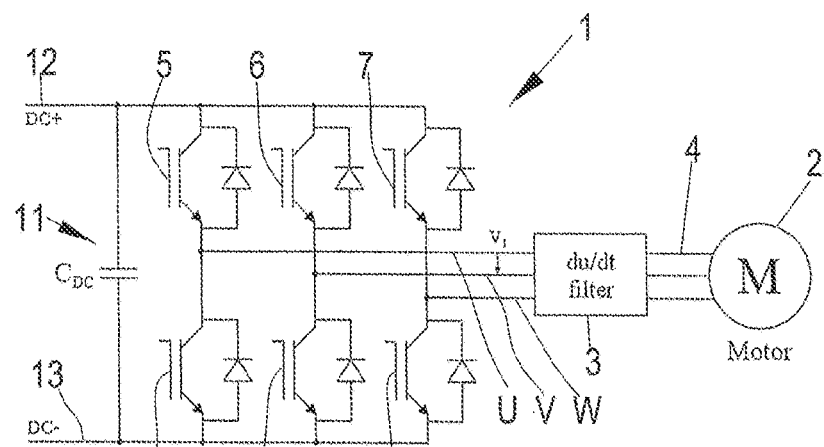
FIG. 1 shows a schematic illustration of an inverter connected to a motor via a du/dt-filter.

FIG. 1 shows schematically an inverter 1 which is connected to a motor 2 via a du/dt-filter 3 and a motor cable 4.

The inverter 1 comprises controllable switches 5, 6, 7, 8, 9, 10 which can be for example in form of insulated gate bipolar transistors "IGBT", gate turn off thyristors "GTO", or some other suitable controllable switch components for power electronic.

Inverter 1 comprises a capacitive intermediate circuit 11 connected between a positive rail 12 and a negative rail 13.

Figure 2:
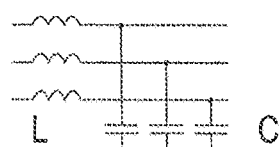
FIG. 2 shows a schematic illustration of a du/dt-filter.

The motor cable 4 is a three-phase cable. The phases U, V, W of the motor cable 4 are connected between the switches 5, 8; 6, 9; and 7, 10, respectively. The du/dt-filter 3 comprises chokes L and star connected capacitors C which together form a second order low pass filter as schematically shown in FIG. 2. In addition there can be resistors in parallel of inductors L or in series with capacitors C to increase damping.

Motor cable 4 behaves as a transmission line. Reflecting waves can increase maximum voltage at motor terminals and voltage can exceed motor specifications especially with long motor cables 4.

When length of the motor cable 4 increases or many cables are connected in parallel propagation time delay $t_d$ increases. The propagation time delay $t_d$ is defined as time for voltage (or any signal) to propagate from the inverter 1 to the motor 2 and can be calculated as:

$$t_d = \frac{l}{v} = l * \sqrt{LC}$$

where l is the length of the motor cable 4, v the propagation velocity, L the inductance of the motor cable 4 and C the capacitance of the motor cable 4.

Figure 3:
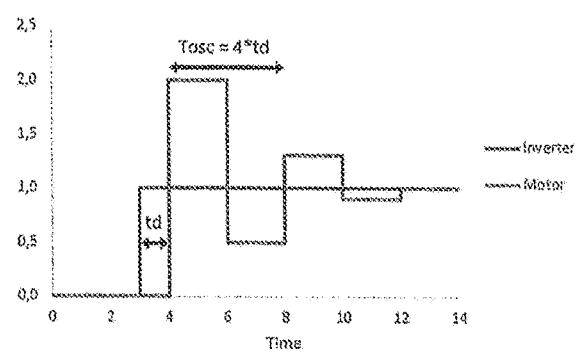
FIG. 3 is a schematic illustration for the definitions of oscillation cycle time and propagation time delay.

The voltage at the terminals of the motor 2 is oscillating because of reflection. The cycle time $T_{OSC}$ is four times the propagation time delay $t_d$, as shown in FIG. 3. In case of short motor cables the oscillation period can be determined mainly by du/dt-filter parameters. Longer motor cables can often decrease the oscillation frequency. However, for the purpose to explain the method, the above assumption that the cycle time $T_{OSC}$ is four times $t_d$ is correct enough.

The propagation time delay $t_d$ can be used as basis for the determination or calculation of a dwell time $T_{dwell}$. The dwell time $T_{dwell}$ is defined as a time between consecutive switchings of the switches 5-10 in the inverter 1. The "switchings" are operations to switch a phase "on" or "off".

Voltage reflections can be optimized by using suitable dwell times in inverter control and in that way it is possible to limit the maximum voltage at the motor 2.

In a first step a test pulse is generated by connecting one phase U to the positive rail 12 or DC+ and another phase V to the negative rail 13 or DC−. For example, the switches 5 and 9 can be made conducting.

The length of the test pulse should be so long that voltage reflections have enough time to generate at least two oscillation peaks at the inverter side. The current generated is an oscillating current. This current can be measured by the inverter 1, i.e. no additional current sensors are necessary.

The test pulse can be also any other differential mode pulse combination.

Figure 4:
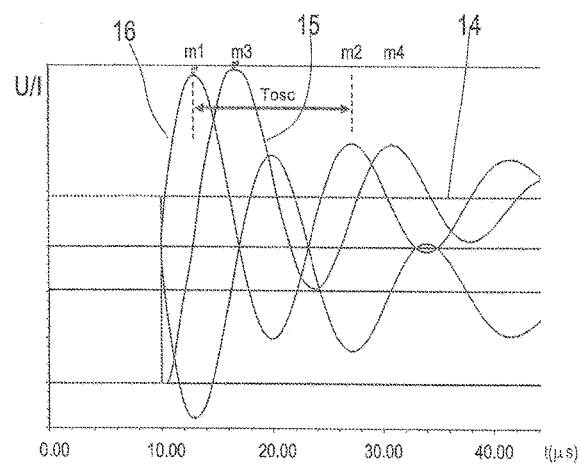
FIG. 4 is a schematic illustration of the cycle time measurement and FIG. 5 is a schematic illustration of the determination of preferred dwell times.
Figure 5:
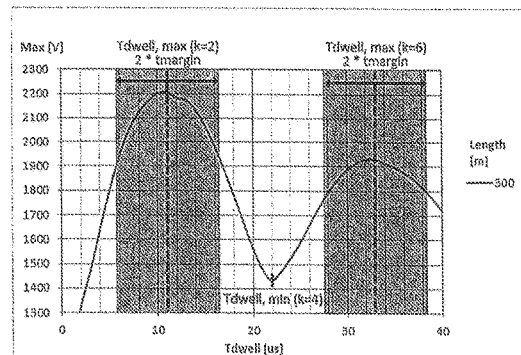

FIG. 4 shows schematically generation of a test pulse 14 at t=10 µs between, for example, phases U and V. A graph 15 shows the voltage at motor 2 between phases U and V and a graph 16 shows the current at the inverter side.

It can be seen that the motor voltage $V_{UV}$ oscillates with a certain cycle time between markers m3 and m4. In the present case the cycle time is 14.3 µs. The cycle time of the current shown in graph 16 in conducting phases is the same, i.e. 14.3 µs, as shown between markers m1 and m2. This cycle time can be measured by detecting two consecutive current peaks, if the voltage pulse 14 is long enough.

The measured cycle time $T_{OSC}$ is four times propagation time delay $t_d$. So the propagation time delay $t_d$ can be calculated as:

$$t_d = \frac{TOSC}{4}.$$

The maximum voltage at the terminals of the motor 2 depends on the dwell time $T_{dwell}$ and the motor cable length. Dwell time can be selected based on the measured propagation time delay $t_d$ so that the voltage is limited, to avoid potentially harmful overvoltages.

Voltage maximums happen if:

$$T_{dwell,max} = k * t_d, \ k \in \{2,6,10,\ldots\}.$$

So values close to these times should be avoided.

Voltage minimums happen if:

$$T_{dwell,min} = k * t_d, \ k \in \{4,8,12,\ldots\}.$$

In other words, voltage minimums happen if k=4*n, wherein n is an integer. Voltage maximums happen if k=4*n−2, wherein k an integer as well.

Thus, values close to the minimum times should be used.

Allowed dwell times can be stored in a look-up table or in any other soft- or hardware based storage means.

A margin $t_{margin}$ can be selected with a parameter p, which is, for example, 50% of the width of the first maximum value (k=2).

It is also possible that the margin $t_{margin}$ is related to k and decreases with k.

A computer program according to an exemplifying and non-limiting embodiment comprises computer executable instructions for controlling a programmable processor to carry out actions related to a method according to any of the above-described exemplifying and non-limiting embodiments.

A computer program for adjusting an inverter connected to an electric motor via a du/dt filter and a motor cable, the computer program comprises computer executable instructions for controlling a programmable processor to:
generating a pulse on the motor cable by means of the inverter,
measuring a cycle time $T_{OSC}$ of a pulse answer from consecutive current peaks,
determining a time delay $t_d$ from the cycle time,
determining a dwell time $T_{dwell}$ to be avoided from the time delay $t_d$ by $$T_{dwell}=k*t_d, k\in\{2,6,10,\ldots\},$$

adjusting the time between consecutive switchings of the inverter to be out of a range from $T_{dwell}-t_A$ to $T_{dwell}+t_A$ wherein $t_A$ is an allowable deviation from $T_{dwell}$. The above-mentioned computer program can be e.g. subroutines and/or functions implemented with a programming language suitable for the programmable processor under consideration.

A computer program product according to an exemplifying and non-limiting embodiment comprises a computer readable medium, e.g. a compact disc "CD", encoded with a computer program according to an exemplifying embodiment.

The non-limiting, specific examples provided in the description given above should not be construed as limiting the scope and/or the applicability of the appended claims. Furthermore, any list or group of examples presented in this document is not exhaustive unless otherwise explicitly stated.

The test pulse 14 should be ended so that switches are not opened at the same time. Otherwise there would be the risk that the test pulse will be reversed because of current commutations.

It is therefore of advantage to open, for example switch 5 50 μs later than switch 9, or generally in range from 40 to 80 μs.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for adjusting an inverter connected to an electric motor via a du/dt filter and a motor cable comprising the steps of
generating a pulse on the motor cable by means of the inverter
measuring a cycle time ($T_{OSC}$) of a pulse answer from consecutive current peaks,
determining a time delay $t_d$ from the cycle time,
determining a dwell time $T_{dwell}$ to be avoided from the time delay $t_d$ by $$T_{dwell}=k\cdot t_d, k\in\{2,6,10,\ldots\}$$

adjusting the time between consecutive switchings of the inverter to be out of a range from $T_{dwell}-t_A$ to $T_{dwell}+t_A$ wherein $t_A$ is an allowable deviation from $T_{dwell}$.

2. The method according to claim 1, wherein the pulse is at least so long as to generate two consecutive reflected current peaks.

3. The method according to claim 1, wherein the generated current is measured by the inverter.

4. The method according to claim 1, wherein $$t_A<2*t_d*p$$

wherein p is a factor depending on a width of the first pulse of the pulse answer, and/or on k.

5. The method according to claim 1, wherein the allowed dwell time $T_{dwell}$ is stored in a look-up table.

6. The method according to claim 1, wherein the pulse is generated by closing a first switch in a first phase (U) and a second switch in a second phase (V) of the inverter.

7. The method according to claim 6, wherein the first switch and the second switch are closed at the same time.

8. The method according to claim 6, wherein at the end of the pulse generation the first switch is opened at a first time and the second switch is opened at a second time different from the first time.

9. The method according to claim 8, wherein a difference between the first time and the second time is in a range from 40 to 80 μs.

10. The method according to claim 2, wherein the generated current is measured by the inverter.

11. The method according to claim 2, wherein $$t_A<2*t_d*p$$

wherein p is a factor depending on a width of the first pulse of the pulse answer, and/or on k.

12. The method according to claim 3, wherein $$t_A<2*t_d*p$$

wherein p is a factor depending on a width of the first pulse of the pulse answer, and/or on k.

13. The method according to claim 2, wherein the allowed dwell time $T_{dwell}$ is stored in a look-up table.

14. The method according to claim 3, wherein the allowed dwell time $T_{dwell}$ is stored in a look-up table.

15. The method according to claim 4, wherein the allowed dwell time $T_{dwell}$ is stored in a look-up table.

16. The method according to claim 2, wherein the pulse is generated by closing a first switch in a first phase (U) and a second switch in a second phase (V) of the inverter.

17. The method according to claim 3, wherein the pulse is generated by closing a first switch in a first phase (U) and a second switch in a second phase (V) of the inverter.

18. The method according to claim 4, wherein the pulse is generated by closing a first switch in a first phase (U) and a second switch in a second phase (V) of the inverter.

19. The method according to claim 5, wherein the pulse is generated by closing a first switch in a first phase (U) and a second switch in a second phase (V) of the inverter.

20. A non-volatile computer readable medium encoded with a computer program for adjusting an inverter connected to an electric motor via a du/dt filter and a motor cable, the computer program comprising computer executable instructions for controlling a programmable processor to:
generating a pulse on the motor cable by means of the inverter,
measuring a cycle time ($T_{OSC}$) of a pulse answer from consecutive current peaks, determining a time delay $t_d$ from the cycle time,
determining a dwell time $T_{dwell}$ to be avoided from the time delay $t_d$ by $$T_{dwell}=k*t_d, k\in\{2,6,10,\ldots\},$$

adjusting the time between consecutive switchings of the inverter to be out of a range from $T_{dwell}-t_A$ to $T_{dwell}+t_A$ wherein $t_A$ is an allowable deviation from $T_{dwell}$.

* * * * *

UNITED STATES PATENT AND TRADEMARK OFFICE
CERTIFICATE OF CORRECTION

| | | |
|---|---|---|
| PATENT NO. | : 10,910,983 B2 | Page 1 of 1 |
| APPLICATION NO. | : 16/542814 | |
| DATED | : February 2, 2021 | |
| INVENTOR(S) | : Sodo et al. | |

It is certified that error appears in the above-identified patent and that said Letters Patent is hereby corrected as shown below:

On the Title Page

Item (30) In the Foreign Priority, please add German Patent Application No. 102018121888.5, filed September 7, 2018.

Signed and Sealed this
Tenth Day of August, 2021

Drew Hirshfeld
*Performing the Functions and Duties of the
Under Secretary of Commerce for Intellectual Property and
Director of the United States Patent and Trademark Office*